May 27, 1958     G. C. SPRAGUE     2,836,652

DEVIATION OF LIGHT BY UTILIZING ELECTRICAL FIELD

Filed Dec. 28, 1954

INVENTOR
Gale C. Sprague

BY Cushman, Darby & Cushman

ATTORNEYS

United States Patent Office 2,836,652
Patented May 27, 1958

2,836,652
DEVIATION OF LIGHT BY UTILIZING ELECTRICAL FIELD

Gale C. Sprague, Rochester, N. Y.

Application December 28, 1954, Serial No. 477,998

2 Claims. (Cl. 178—7.6)

This invention relates to novel apparatus for the controlled electrical deflection of a beam of light comprising means for producing an electrostatic field in a medium of light-passing material, said means comprising at least two electrode elements, at least one of which has a sharp edge, positioned adjacent said light-passing medium.

Heretofore, apparatus utilized for the electrical deflection of a beam of light produced a negligible effect. In order to attain even the slightest amount of deflection, an electrostatic field was utilized necessitating extremely high voltages which are quite impractical to obtain on an operational basis.

In view of the fact, however, that the utilization of a controlled beam of light possesses many advantages over, for example, a controlled deflection of an electronic beam, research has been conducted to obtain apparatus which can be utilized for the controlled deflection of a light beam, yet without the necessity of disadvantages such as the need for the impractically high voltages noted heretofore.

The present invention involves the attainment of these large electrostatic fields by means of specially shaped electrodes. Using such specially shaped electrodes in a material whose light deflecting properties can be altered by an electrostatic field, results, in effect, in the realization of a light-passing region which possesses an index of refraction that can be varied by variation of the electrostatic field applied thereto.

The particular apparatus noted heretofore, and to be discussed hereinafter, possesses additional advantages such as the fact that polarized light need not be used and that uniform electrical or mechanical fields need not be applied.

With the above in mind, the primary object of the present invention is stated to be the provision of novel apparatus for the controlled electrical deflection of a beam of light comprising means for producing an electrostatic field in a medium of light-passing material, said means comprising at least two electrode elements, at least one of which has a sharp edge, positioned adjacent said light-passing medium.

Another object of this invention is to provide apparatus for the controlled electrical deflection of a beam of light as noted heretofore and including means for varying the strength of the said electrostatic field to thereby vary the index of refraction of said light-passing medium.

A more specific object of this invention is to provide a television receiver system without the need of a cathode ray tube, said system comprising a source of light to produce a beam of light, a medium of light-passing material, means for producing an electrostatic field in said medium, said means comprising at least two electrode elements, at least one of which has a sharp edge positioned adjacent said light-passing material and means for varying the strength of the said electrostatic field to thereby vary the index of refraction of the said light-passing medium and coincidentally, vary the angle of refraction of light passing therethrough, thus producing a sweep of light utilizable for television scanning.

Still further objects and the entire scope of applicability of the present invention will become apparent from the detailed description given hereinafter. It should be understood, however, that the detailed description, while indicating preferred embodiments of the invention, is given by way of illustration only, since various changes and modifications within the spirit and scope of the invention will become apparent to those skilled in the art from this detailed description.

In the present invention, a beam of light is bent by application of electrostatic fields to a material. This material can be, for example, water, glass, nitrobenzene, or quartz. Other materials could be utilized but, it should be noted that the preferred medium is nitrobenzene.

The basic principle is my use of specially shaped electrodes for the formation of a curved electric field which will cause a curved region of index of refraction different from the main portion of the light-passing medium. In other words, a lens or prism can be formed electrically, and changed electrically at high frequencies. A beam of light, incident upon such region, is deflected dependent upon the instantaneous effect of the field. The applications are numerous and, as noted heretofore, this apparatus can particularly be used to replace the more complex high power electron tubes in television and radar receivers.

The novel apparatus comprising my invention is well illustrated in the drawings. Referring to the drawings, Figure 1 is a side view of an electrode arrangement that can be utilized for the attainment of the electrostatic fields necessary for the desired controlled electrical deflection of a beam of light;

Figure 1:
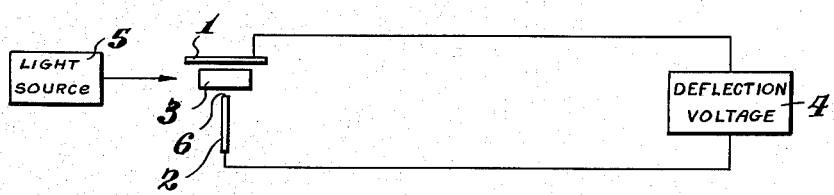

Figure 1 is illustrative of the electrode shape that is critical to the attainment of a practical apparatus for the deflection of a beam of light. Electrodes 1 and 2 are positioned on either side of a light-passing medium 3 receiving light from light source 5. The critical aspect of these electrodes is the fact that at least one possesses a sharp point or edge 6. In Figure 1, electrode 2 is a flat piece of metal with its edge positioned perpendicular to the opposite electrode. A usable deflection can be obtained by applying as little as a 1,000 volt signal from voltage source 4.

Figure 2:
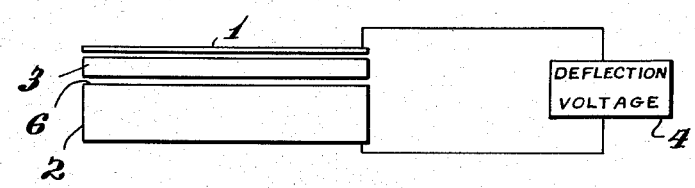
Figure 2 is an end view of the illustrated modification.
Figure 3:
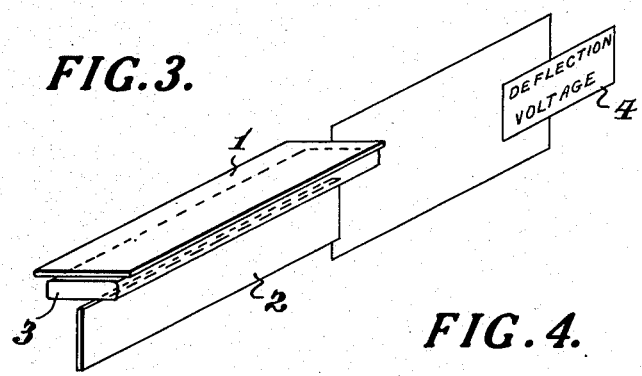
Figure 3 is a perspective view thereof.

Figure 2 is an end view showing the respective positions of the illustrated electrodes. Figure 3 is a perspective view. It should be stressed that the critical aspect is the necessity of a sharp point or edge 6 which solves the previously presented problem of the necessity for extremely high voltages.

Figure 4:
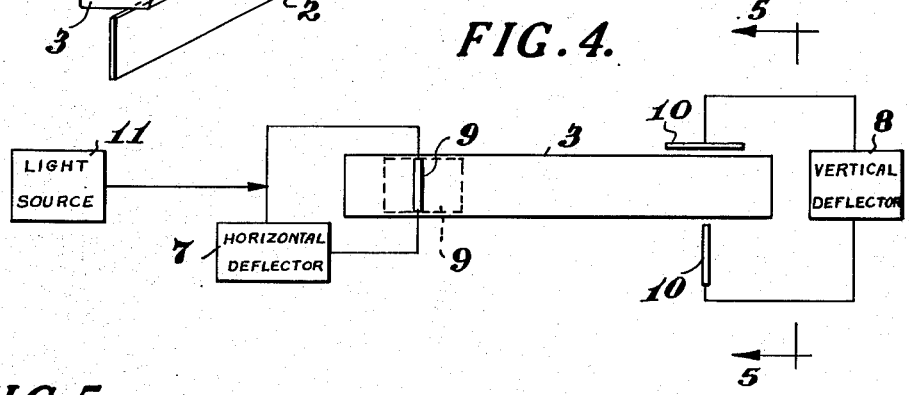
Figure 4 is a side view of a combination of two of my devices utilized to produce a television scanning system.
Figure 5:
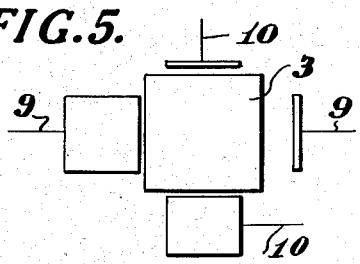
Figure 5 is an end view of the modification shown in Figure 4.

In applying this novel apparatus to a particular purpose, a television scanning system merits consideration. The principle involved in view of the present day television scanning system is the replacement of electron beam deflection by optical deflection of a light beam. Standard circuits would be used in the application of my invention. For example, the synchronization signals would be separated from the carrier wave by standard circuits, amplified by standard circuits, and then applied to the vertical and horizontal sweep generators 7 and 8 (Figures 4 and 5) which generate respective deflection voltages which may be applied to the horizontal and vertical electrode arrangement of my invention as illustrated in Figures 4 and 5 at 9 and 10.

Of course, the intensity of the light beam from light source 11 is varied in accordance with the amplitude of the picture signal by standard circuits to produce a picture on the screen receiving the said light beam. Alternatively, the light beam could be deflected towards or away from a hole to regulate the intensity of light emerging from the hole.

The invention is particularly applicable to a color television system, as can easily be appreciated. At the present time, mechanical color discs or oriented phosphors on the surface of the picture tube are used and these would be unnecessary if a light beam was employed in the scanning system. A three "gun" system could be used requiring three light sources, three optical filters for the three primary colors, and at least six of my novel beam deflectors. A convergence circuit may be used, or replaced by optical devices. Standard synchronizing circuits would be applied.

It should be stressed that the difficulty overcome by applying my novel electrode apparatus to the system generally noted above has been the necessity of the high voltages. As previously noted, light beam deflectors used heretofore had never produced sufficient effect as a practical matter.

It can be appreciated that the electrodes shown in the drawings are merely an illustration of the special shaping which is contemplated by the invention. The vital feature of these electrodes is only that at least one should have a sharp edge. In other words, the novelty of the invention is not that the electrodes are one particular shape, but rather, that the use of at least one sharp edge or pointed electrode regardless of specific shape, solves the problem presented in the prior art.

By my novel apparatus, I have succeeded in producing a system for the controlled electrical deflection of a beam of light yielding the advantages set forth above. As a result of this apparatus, controlled electrical deflection of a beam of light is realized without the necessity of impractically high voltages utilized heretofore in the art.

This invention can be typically utilized in a television receiver system. As previously noted, such use eliminates the need of a large cathode ray tube and accompanying limited picture size, since a light beam, unlike an electron beam, travels through air.

As noted heretofore, the deflection of my apparatus is similar to that produced by an optical prism. Accordingly, the attainment of color by passing a beam of light through my apparatus is also contemplated. Of course, a separate unit would be required.

The novel principles of this invention are broader than the specific embodiments described above, and rather than unduly extend this disclosure by attempting to list all of the numerous modifications that can be conceived and reduced to practice during the course of this development, these novel features are defined in the following claims.

I claim:

1. A light refractive device comprising in combination, a source for emitting a non-polarized beam of light, a pair of electrodes for producing an electrostatic field therebetween, a transparent birefringent medium disposed within said field through which said beam passes, one of said electrodes having a sharp edge portion extending in a direction transverse to said beam, the other electrode of said pair having a planar surface disposed substantially perpendicular to and facing said edge portion, said edge portion being positioned adjacent said medium for producing an electrostatic field of parabolic outline in a plane perpendicular to both said planar surface and said edge portion with the vertex thereof being formed adjacent said edge portion whereby light normal to said medium at all points intermediate said electrodes is refracted.

2. A light refractive device as set forth in claim 1 including means for varying the intensity of said field to control the deviation of said beam in its passage through said medium.

References Cited in the file of this patent

UNITED STATES PATENTS 2,163,550    Clothier et al. _____ June 20, 1939